United States Patent
Voelzke et al.

(10) Patent No.: US 12,486,930 B2
(45) Date of Patent: Dec. 2, 2025

(54) REDUCING FASTENER HAVING FLEXIBLE SLEEVES FOR CONNECTING A COATED CONDUIT TO A FITTING

(71) Applicant: Robroy Industries—Texas, LLC, Gilmer, TX (US)

(72) Inventors: Steven A. Voelzke, Longview, TX (US); Christopher M. Caldwell, Longview, TX (US); Tabitha Stricklin, Forney, TX (US)

(73) Assignee: Robroy Industries—Texas, LLC, Gilmer, TX (US)

( * ) Notice: Subject to any disclaimer, the term of this patent is extended or adjusted under 35 U.S.C. 154(b) by 85 days.

(21) Appl. No.: 18/422,565

(22) Filed: Jan. 25, 2024

(65) Prior Publication Data
US 2024/0255078 A1 Aug. 1, 2024

Related U.S. Application Data

(60) Provisional application No. 63/481,868, filed on Jan. 27, 2023.

(51) Int. Cl.
*F16L 19/02* (2006.01)
(52) U.S. Cl.
CPC ................. *F16L 19/0243* (2013.01)
(58) Field of Classification Search
CPC ....... F16L 58/182; F16L 58/184; F16L 47/04; F16L 47/16; F16L 19/0243
See application file for complete search history.

(56) References Cited

U.S. PATENT DOCUMENTS

| | | | | |
|---|---|---|---|---|
| 332,754 A | * | 12/1885 | Scott ....................... | F16L 47/04 285/289.1 |
| 679,399 A | * | 7/1901 | Smith et al. ............ | F16L 47/04 285/331 |
| 3,226,137 A | * | 12/1965 | Trnka ...................... | F16L 47/16 285/379 |

(Continued)

FOREIGN PATENT DOCUMENTS

| | | | | |
|---|---|---|---|---|
| CN | 106764210 A | * | 5/2017 | ............... F16L 47/16 |
| GB | 1456143 A | * | 11/1976 | ............... F16L 47/04 |

(Continued)

*Primary Examiner* — Zachary T Dragicevich
*Assistant Examiner* — Fannie Kee
(74) *Attorney, Agent, or Firm* — The Webb Law Firm

(57) ABSTRACT

A fastener for connecting a coated conduit to a fitting or to another coated conduit includes a bushing and polymeric material coating and surrounding an external surface of the bushing. The bushing includes internal and external threading The polymeric material includes a central portion coating at least the first end of the bushing, a first flexible sleeve extending from the central portion in a first direction and creating a cavity, and a second flexible sleeve extending from the central portion in a second direction, opposite the first direction. The external threading of the bushing is configured to be threaded into a fitting or conduit such that the first flexible sleeve fits over a circumference of the fitting or a coated conduit, and the internal threading of the bushing is configured to be threaded onto coated conduit such that the second flexible sleeve fits over a circumference of the coated conduit.

15 Claims, 7 Drawing Sheets

(56) References Cited

U.S. PATENT DOCUMENTS

| | | | | |
|---|---|---|---|---|
| 3,404,905 A | * | 10/1968 | Albrecht | F16L 47/04 285/348 |
| 4,107,452 A | * | 8/1978 | Razvi | F16L 47/16 285/55 |
| 4,253,686 A | * | 3/1981 | Aitken | F16L 47/04 285/382.7 |
| 4,369,781 A | * | 1/1983 | Gilson | F16L 47/16 604/905 |
| 4,427,219 A | * | 1/1984 | Madej | F16L 47/04 285/331 |
| 4,614,372 A | * | 9/1986 | Gschwind | F16L 47/04 285/356 |
| 5,051,541 A | * | 9/1991 | Bawa | F16L 47/04 285/151.1 |
| 5,176,415 A | * | 1/1993 | Choksi | F16L 47/16 285/332.1 |
| 5,350,202 A | * | 9/1994 | Fritz | F16L 47/16 285/392 |
| 2011/0115220 A1 | * | 5/2011 | Kuo | F16L 58/184 285/353 |

FOREIGN PATENT DOCUMENTS

| | | | | | |
|---|---|---|---|---|---|
| KR | 20200120813 A | * | 10/2020 | | F16L 47/16 |
| KR | 102274511 B1 | * | 7/2021 | | F16L 47/16 |
| WO | WO-2007004343 A1 | * | 1/2007 | | F16L 47/04 |
| WO | WO-2013168306 A1 | * | 11/2013 | | F16L 47/04 |

* cited by examiner

REDUCING FASTENER HAVING FLEXIBLE SLEEVES FOR CONNECTING A COATED CONDUIT TO A FITTING

CROSS-REFERENCE TO RELATED APPLICATION

This application claims the benefit of U.S. Provisional Patent Application No. 63/481,868, which was filed Jan. 27, 2023, the disclosure of which is incorporated by reference in its entirety.

BACKGROUND

Field of the Disclosure

The present disclosure relates to a reducing fastener for connecting a coated conduit to a fitting not configured to accept the given trade size of the coated conduit, with improved sealing and adequate protection of the exposed threading of the coated conduit and, more specifically, to a reducing fastener having flexible sleeves.

Description of Related Art

The primary function of a PVC-coated conduit system is to maximize the life of the electrical system contained within it and to prevent corrosion from sabotaging its structural integrity. This is achieved through PVC coating adhered to the external surface of the system, preventing exposure to external environmental conditions that could result in corrosion of the steel or aluminum system underneath, and an internal urethane coating that prevents corrosion from atmospheric conditions that could compromise the system from within.

However, a system is only as strong as its weakest link. Connections and joints in particular are locations that offer an opportunity for corrosive agents to invade a structure by allowing exposure of uncoated sections of its components. One of the most common exposures occurs at the threads of conduit connections into outlet boxes, conduit bodies, and joint and other fittings. More specifically, and with reference to FIG. 1, when a coated conduit (not shown) is connected to a fitting 4, such as an outlet body, or joint fitting, a portion of the uncoated threads (not shown), (made from steel or aluminum), of the coated conduit remains exposed to the environment when the coated conduit is properly connected to the fitting. Raw exposed steel and aluminum threads provide a location for moisture in the air to condense and result in crevice corrosion and pitting between the protective coatings.

Specifically, connections utilizing reducing fasteners, for example reducing bushings, may incur this exposure. Reducing fasteners allow connection of a conduit to a fitting not configured to accept the given trade size of the conduit, or connection between differing trade sizes of conduits. A variety of reducing fasteners exist in different shapes, materials, and configurations to allow a reducing connection and compatibility between a conduit and a fitting not configured to accept the given trade size of the conduit, or between differing trade sizes of conduits. Reducing fasteners, in particular, often incur sealing deficiencies and allow exposure of threading of the coated conduit to external environmental conditions due to complex configurations and imperfect fit.

A variety of solutions exist to prevent the exposure of conduit threads at joints. For example, manufacturers of PVC-coated systems design fittings to provide uniform protection from the external environment at joints. However, such currently available systems suffer from various deficiencies and do not adequately protect the exposed threading of the coated conduit, particularly in connections utilizing reducing fasteners.

In view of the foregoing, there exists a need for a reducing fastener for connecting a coated conduit to a fitting not configured to accept the given trade size of the coated conduit, with improved sealing and adequate protection of the exposed threading of the coated conduit.

SUMMARY

Accordingly, aspects of the present disclosure are directed to non-limiting embodiments of a reducing fastener for connecting a coated conduit to a fitting not configured to accept the given trade size of the coated conduit.

According to an aspect of the disclosure, a fastener for connecting a coated conduit to a fitting includes a bushing having a first end, a second end, internal threading extending between the first end and the second end, and external threading extending between the first end and the second end, and polymeric material coating and surrounding an external surface of the bushing. The polymeric material including a central portion coating at least the first end of the bushing, a first flexible sleeve formed from the polymeric material extending from the central portion toward the second end of the bushing in a first direction and creating a cavity between an inner surface thereof and the external threading of the bushing, and a second flexible sleeve formed from the polymeric material extending from the central portion in a second direction, opposite the first direction. The external threading of the bushing is configured to be threaded into exposed threading of the fitting such that the first flexible sleeve fits over a circumference of the fitting to form a sealed connection and the internal threading of the bushing is configured to be threaded onto exposed threading of the coated conduit such that the second flexible sleeve fits over a circumference of the coated conduit to form a sealed connection.

In some non-limiting embodiments of a fastener for connecting a coated conduit to a fitting, the circumference of the coated conduit may be smaller than the circumference of the fitting.

In some non-limiting embodiments of a fastener for connecting a coated conduit to a fitting, the polymeric material may be polyvinyl chloride.

In some non-limiting embodiments of a fastener for connecting a coated conduit to a fitting, the bushing may be manufactured from steel or aluminum.

According to an aspect of the disclosure, a fastener for connecting a first coated conduit to a second coated conduit includes a bushing having a first end, a second end, internal threading extending between the first end and the second end, and external threading extending between the first end and the second end, and polymeric material coating and surrounding an external surface of the bushing. The polymeric material includes a central portion coating at least the first end of the bushing, a first flexible sleeve formed from the polymeric material extending from the central portion toward the second end of the bushing in a first direction and creating a cavity between an inner surface thereof and the external threading of the bushing, and a second flexible sleeve formed from the polymeric material extending from the central portion in a second direction, opposite the first direction. The external threading of the bushing is configured to be threaded into exposed threading of the first coated conduit such that the first flexible sleeve fits over a circumference of the first coated conduit to form a sealed connection and the internal threading of the bushing is configured to be threaded onto exposed threading of the second coated conduit such that the second flexible sleeve fits over a circumference of the second coated conduit to form a sealed connection.

In some non-limiting embodiments of a fastener for connecting a first coated conduit to a second coated conduit, the circumference of the first coated conduit may be greater than the circumference of the second coated conduit.

In some non-limiting embodiments of a fastener for connecting a first coated conduit to a second coated conduit, the polymeric material may be polyvinyl chloride.

In some non-limiting embodiments of a fastener for connecting a first coated conduit to a second coated conduit, the bushing may be manufactured from steel or aluminum.

According to an aspect of the disclosure, a conduit system includes a coated conduit comprising a cylindrical body with a first end comprising threads and a fastener. The fastener includes a bushing having a first end, a second end, internal threading extending between the first end and the second end, and external threading extending between the first end and the second end, and polymeric material coating and surrounding an external surface of the bushing. The polymeric material includes a central portion coating at least the first end of the bushing, a first flexible sleeve formed from the polymeric material extending from the central portion toward the second end of the bushing in a first direction and creating a cavity between an inner surface thereof and the external threading of the bushing, and a second flexible sleeve formed from the polymeric material extending from the central portion in a second direction, opposite the first direction. The internal threading of the bushing is threaded onto exposed threading of the coated conduit such that the second flexible sleeve fits over a circumference of the coated conduit to form a sealed connection.

In some non-limiting embodiments of a conduit system, the external threading of the bushing may be threaded into exposed threading of the fitting such that the first flexible sleeve fits over a circumference of the fitting to form a sealed connection.

In some non-limiting embodiments of a conduit system, the polymeric material may be polyvinyl chloride.

In some non-limiting embodiments of a conduit system, the bushing may be manufactured from steel or aluminum.

According to an aspect of the disclosure, a method of connecting a coated conduit to a fitting includes providing a fastener. The fastener includes a bushing having a first end, a second end, internal threading extending between the first end and the second end, and external threading extending between the first end and the second end, and polymeric material coating and surrounding an external surface of the bushing. The polymeric material includes a central portion coating at least the first end of the bushing, a first flexible sleeve formed from the polymeric material extending from the central portion toward the second end of the bushing in a first direction and creating a cavity between an inner surface thereof and the external threading of the bushing, and a second flexible sleeve formed from the polymeric material extending from the central portion in a second direction, opposite the first direction. The method further includes threading the external threading of the bushing into exposed threading of the fitting such that the first flexible sleeve fits over a circumference of the fitting to form a sealed connection, and threading the internal threading of the bushing onto exposed threading of the coated conduit such that the second flexible sleeve fits over a circumference of the coated conduit to form a sealed connection.

In some non-limiting embodiments of a method of connecting a coated conduit to a fitting, the polymeric material may be polyvinyl chloride.

In some non-limiting embodiments of a method of connecting a coated conduit to a fitting, the bushing may be manufactured from steel or aluminum.

Non-limiting illustrative examples of the embodiments of the present disclosure will now be described in the following numbered clauses.

Clause 1: A fastener for connecting a coated conduit to a fitting, comprising: a bushing having a first end, a second end, internal threading extending between the first end and the second end, and external threading extending between the first end and the second end; and polymeric material coating and surrounding an external surface of the bushing, the polymeric material comprising: a central portion coating at least the first end of the bushing; a first flexible sleeve formed from the polymeric material extending from the central portion toward the second end of the bushing in a first direction and creating a cavity between an inner surface thereof and the external threading of the bushing; and a second flexible sleeve formed from the polymeric material extending from the central portion in a second direction, opposite the first direction, wherein the external threading of the bushing is configured to be threaded into exposed threading of the fitting such that the first flexible sleeve fits over a circumference of the fitting to form a sealed connection and the internal threading of the bushing is configured to be threaded onto exposed threading of the coated conduit such that the second flexible sleeve fits over a circumference of the coated conduit to form a sealed connection.

Clause 2: The fastener of clause 1, wherein the circumference of the coated conduit is smaller than circumference of the fitting.

Clause 3: The fastener of clause 1, wherein the polymeric material is polyvinyl chloride.

Clause 4: The fastener of clause 1, wherein the bushing is manufactured from steel or aluminum.

Clause 5: A fastener for connecting a first coated conduit to a second coated conduit, comprising: a bushing having a first end, a second end, internal threading extending between the first end and the second end, and external threading extending between the first end and the second end; and polymeric material coating and surrounding an external surface of the bushing, the polymeric material comprising: a central portion coating at least the first end of the bushing; a first flexible sleeve formed from the polymeric material extending from the central portion toward the second end of the bushing in a first direction and creating a cavity between an inner surface thereof and the external threading of the bushing; and a second flexible sleeve formed from the polymeric material extending from the central portion in a second direction, opposite the first direction, wherein the external threading of the bushing is configured to be threaded into exposed threading of the first coated conduit such that the first flexible sleeve fits over a circumference of the first coated conduit to form a sealed connection and the internal threading of the bushing is configured to be threaded onto exposed threading of the second coated conduit such that the second flexible sleeve fits over a circumference of the second coated conduit to form a sealed connection.

Clause 6: The fastener of clause 5, wherein the circumference of the first coated conduit is greater than the circumference of the second coated conduit.

Clause 7: The fastener of clause 5, wherein the polymeric material is polyvinyl chloride.

Clause 8: The fastener of clause 5, wherein the bushing is manufactured from steel or aluminum.

Clause 9: A conduit system comprising: a coated conduit comprising a cylindrical body with a first end comprising threads; and a fastener comprising: a bushing having a first end, a second end, internal threading extending between the first end and the second end, and external threading extending between the first end and the second end; and polymeric material coating and surrounding an external surface of the bushing, the polymeric material comprising: a central portion coating at least the first end of the bushing; a first flexible sleeve formed from the polymeric material extending from the central portion toward the second end of the bushing in a first direction and creating a cavity between an inner surface thereof and the external threading of the bushing; and a second flexible sleeve formed from the polymeric material extending from the central portion in a second direction, opposite the first direction, wherein the internal threading of the bushing is threaded onto exposed threading of the coated conduit such that the second flexible sleeve fits over a circumference of the coated conduit to form a sealed connection.

Clause 10: The conduit system of clause 9, wherein the external threading of the bushing is threaded into exposed threading of the fitting such that the first flexible sleeve fits over a circumference of the fitting to form a sealed connection.

Clause 11: The conduit system of clause 9, wherein the polymeric material is polyvinyl chloride.

Clause 12: The conduit system of clause 9, wherein the bushing is manufactured from steel or aluminum.

Clause 13: A method of connecting a coated conduit to a fitting comprising: providing a fastener comprising: a bushing having a first end, a second end, internal threading extending between the first end and the second end, and external threading extending between the first end and the second end; and polymeric material coating and surrounding an external surface of the bushing, the polymeric material comprising: a central portion coating at least the first end of the bushing; a first flexible sleeve formed from the polymeric material extending from the central portion toward the second end of the bushing in a first direction and creating a cavity between an inner surface thereof and the external threading of the bushing; and a second flexible sleeve formed from the polymeric material extending from the central portion in a second direction, opposite the first direction, threading the external threading of the bushing into exposed threading of the fitting such that the first flexible sleeve fits over a circumference of the fitting to form a sealed connection; and threading the internal threading of the bushing onto exposed threading of the coated conduit such that the second flexible sleeve fits over a circumference of the coated conduit to form a sealed connection.

Clause 14: The method of clause 13, wherein the polymeric material is polyvinyl chloride.

Clause 15: The method of clause 13, wherein the bushing is manufactured from steel or aluminum.

Further details and advantages of the various examples described in detail herein will become clear upon reviewing the following detailed description of the various examples in conjunction with the accompanying drawing figures.

BRIEF DESCRIPTION OF THE DRAWINGS

Additional advantages and details are explained in greater detail below with reference to the exemplary embodiments that are illustrated in the accompanying schematic figures, in which.

Corresponding reference characters indicate corresponding parts throughout the several views. The exemplifications set out herein illustrate exemplary embodiments of the disclosure, and such embodiment are not to be construed as limiting the scope of the disclosure in any manner.

DETAILED DESCRIPTION

Figure 1:
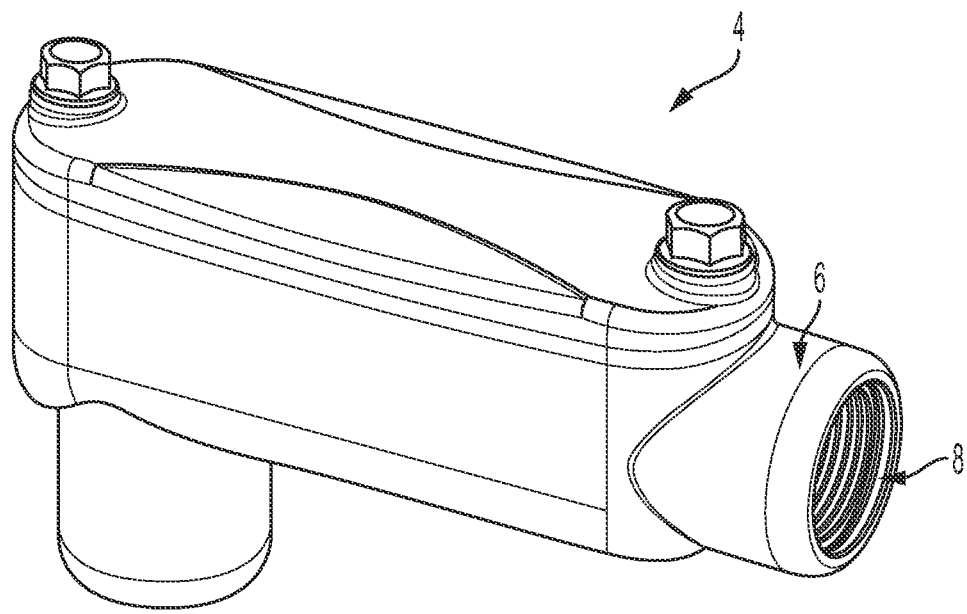
FIG. 1 is a perspective view of an example of a joint fitting of a conduit to which a fastener in accordance with the present disclosure may be connected.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise.

Embodiments of the present disclosure are directed to an improved reducing fastener for connecting a coated conduit to a fitting not configured to accept the given trade size of the coated conduit, with improved sealing and adequate protection of the exposed threading of the coated conduit. According to non-limiting embodiments, an improved fastener for connecting a coated conduit to a fitting may include a bushing having a first end, a second end, internal threading extending between the first end and the second end, and external threading extending between the first end and the second end, and polymeric material coating and surrounding an external surface of the bushing. The polymeric material may include a central portion coating at least the first end of the bushing, a first flexible sleeve formed from the polymeric material extending from the central portion toward the second end of the bushing in a first direction and creating a cavity between an inner surface thereof and the external threading of the bushing, and a second flexible sleeve formed from the polymeric material extending from the central portion in a second direction, opposite the first direction. The external threading of the bushing may be configured to be threaded into exposed threading of the fitting such that the first flexible sleeve fits over a circumference of the fitting to form a sealed connection and the internal threading of the bushing may be configured to be threaded onto exposed threading of the coated conduit such that the second flexible sleeve fits over a circumference of the coated conduit to form a sealed connection.

In this way, embodiments of the present disclosure allow for connecting a coated conduit to a fitting not configured to accept the given trade size of the coated conduit, with improved sealing and adequate protection of the exposed threading of the coated conduit.

Referring now to FIG. 1, FIG. 1 is a perspective view of an example of a fitting 4 of a conduit. Fastener 100, in accordance with the present disclosure and as shown in FIGS. 2, 3A-3B, 6, and 7, may be connected to fitting 4. As shown in FIG. 1, fitting 4 may include circumference 6 and internal threading 8.

Referring now to FIGS. 2, 3A-3B, 4, 5, and 6, fastener 100 for connecting a coated conduit 2 to a fitting 4 may include bushing 114, and bushing 114 may have first end 116, second end 118, internal threading 120 and external threading 122. Internal threading 120 may extend between first end 116 and second end 118, and external threading 122 may extend between first end 116 and second end 118. Fastener 100 may include polymeric material 124, and polymeric material 124 may coat and surround an external surface of bushing 114, including internal threading 122. The term "external threading" and feature "external threading 122" as used and described herein may generally refer to the external threading of bushing 114 including the portion of polymeric material 124 coating the external threading of bushing 114.

Figure 2:
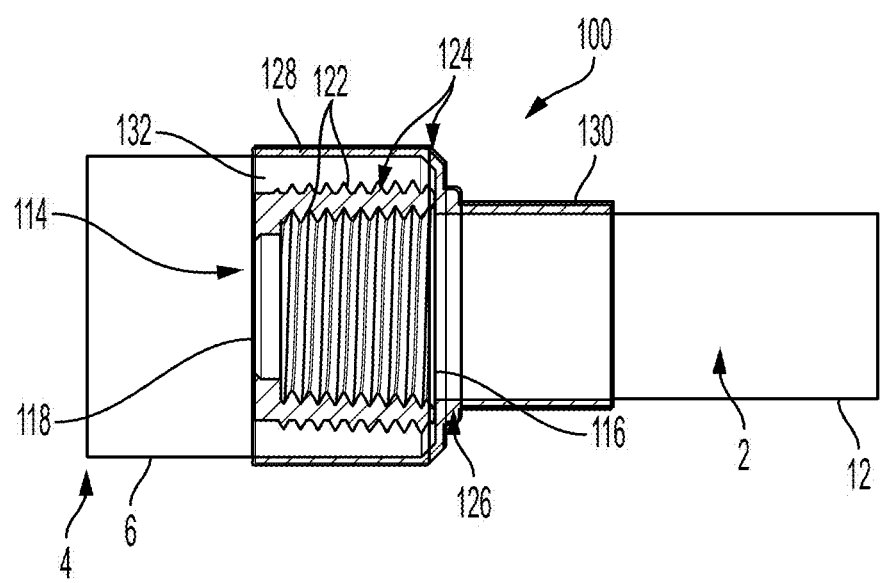
FIG. 2 is a sectional view of a non-limiting embodiment of an implementation of a fastener in accordance with the present disclosure.
Figure 3A:
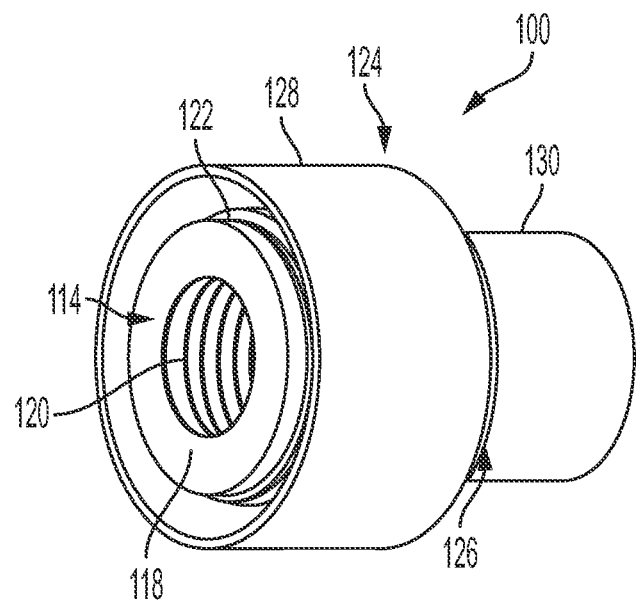
FIGS. 3A and 3B are perspective views of a non-limiting embodiment of a fastener in accordance with the present disclosure.
Figure 3B:
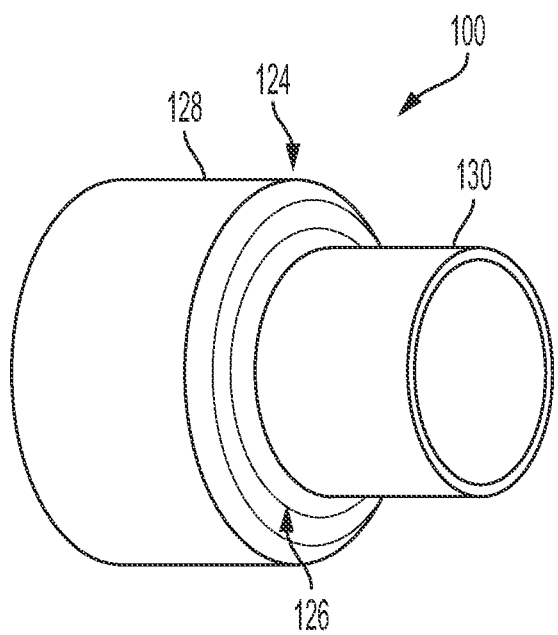
Figure 4:
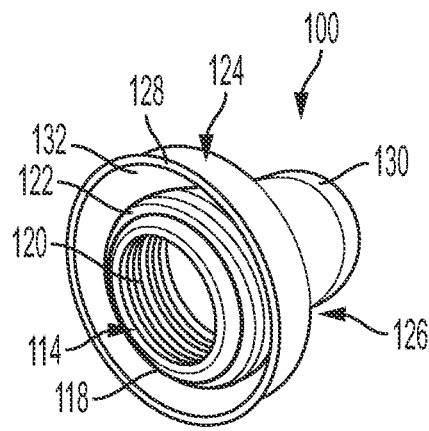
FIG. 4 is a perspective view of a non-limiting embodiment of a fastener in accordance with the present disclosure.

Polymeric material 124 may include central portion 126 and polymeric material 124 may coat at least first end 116 of bushing 114. First flexible sleeve 128 may be formed from polymeric material 124 and first flexible sleeve 128 may extend from central portion 126 toward second end 118 of bushing 114 in a first direction. As shown in FIGS. 2, 3A and 4, first flexible sleeve 128 and external threading 122 of bushing 114 may create cavity 132 between an inner surface of first flexible sleeve 128 and external threading 122 of bushing 114. Second flexible sleeve 130 may be formed from polymeric material 124 and second flexible sleeve 130 may extend from central portion 126 in a second direction. The second direction may be opposite the first direction.

External threading 122 of bushing 114 may be configured to be threaded into exposed threading of fitting 4 such that first flexible sleeve 128 fits over circumference 6 of fitting 4 to form a sealed connection. Internal threading 120 of bushing 114 may be configured to be threaded onto exposed threading of coated conduit 2 such that second flexible sleeve 130 fits over circumference 12 of coated conduit 2 to form a sealed connection.

As shown in FIG. 2, fastener 100 may be configured to connect coated conduit 2 to fitting 4, and coated conduit 2 may have circumference 12. Circumference 12 may be smaller than circumference 6 of fitting 4. Fastener 100 and bushing 114 may be manufactured in a variety of different sizes to accommodate a variety of different sizes of conduits and fittings.

Figure 5:
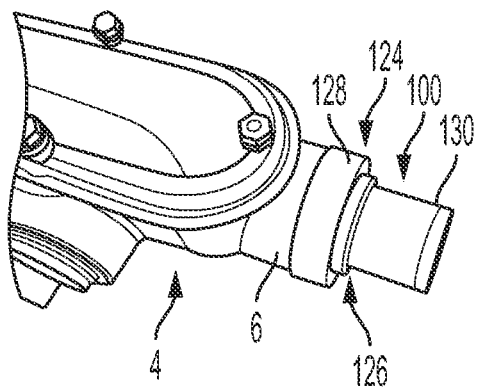
FIG. 5 is a perspective view of a non-limiting embodiment of an implementation of a fastener in accordance with the present disclosure.

In some non-limiting embodiments, as shown in FIGS. 4 and 5, polymeric material 124 of fastener 100 may be polyvinyl chloride (PVC). In other non-limiting embodiments, polymeric material 124 of fastener 100 may be comprised of another suitable plastic or polymer such as high density polyethylene (HDPE), polypropylene (PP), or the like.

Figure 6:
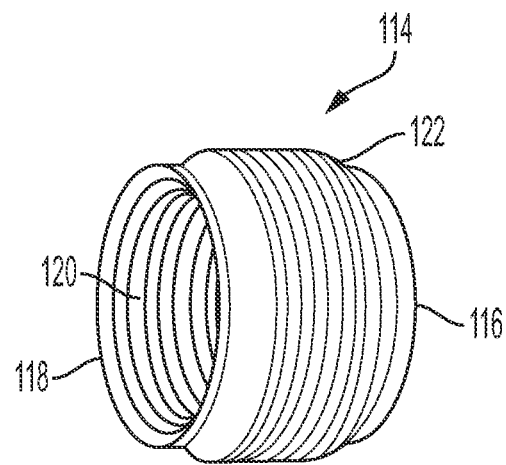
FIG. 6 is a perspective view of a non-limiting embodiment of a bushing in accordance with the present disclosure.

In some non-limiting embodiments, as shown in FIG. 6, bushing 114 of fastener 100 may be manufactured from steel. In some non-limiting embodiments, bushing 114 of fastener 100 may be manufactured from aluminum. In other non-limiting embodiments, bushing 114 of fastener 100 may be comprised of another metal or alloy such as an aluminum alloy, a steel alloy, or the like.

A method for connecting a coated conduit such as coated conduit 2 to a fitting such as fitting 4 may include providing fastener 100. The method may further include threading external threading 122 of bushing 114 into exposed threading of fitting 4 such that first flexible sleeve 128 fits over a circumference 6 of fitting 4 to form a sealed connection, and threading internal threading 120 of bushing 114 onto exposed threading of coated conduit 2 such that second flexible sleeve 12 fits over circumference 12 of coated conduit 2 to form a sealed connection.

Figure 7:
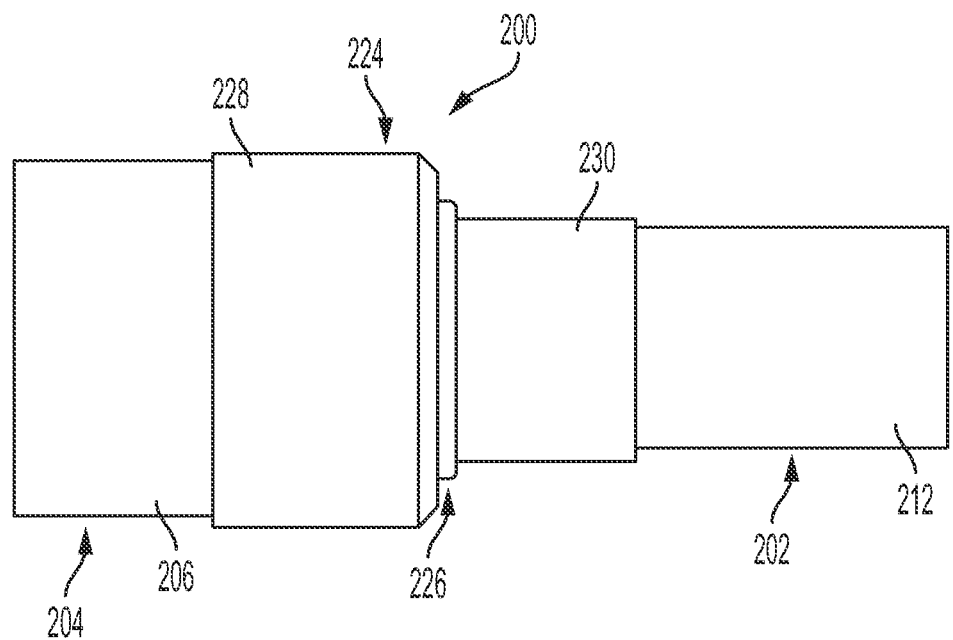
FIG. 7 is a side view of a non-limiting embodiment of an implementation of a fastener in accordance with the present disclosure.
Figure 8:
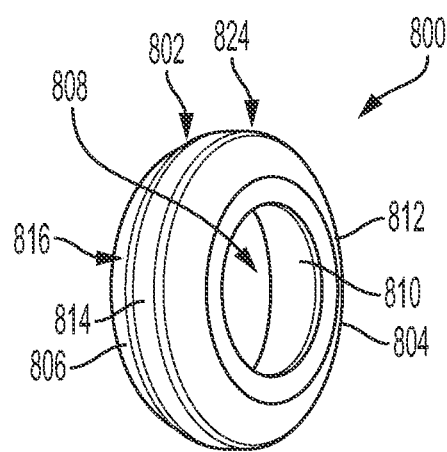
FIG. 8 is a perspective view of a non-limiting embodiment of an adaptor fitting in accordance with the present disclosure.
Figure 9A:
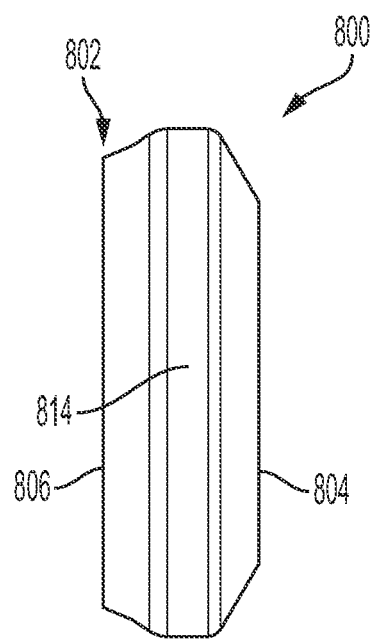
FIGS. 9A, 9B, and 9C are a side view, a sectional view, and a top view, respectively, of a non-limiting embodiment of an adaptor fitting in accordance with the present disclosure.
Figure 9B:
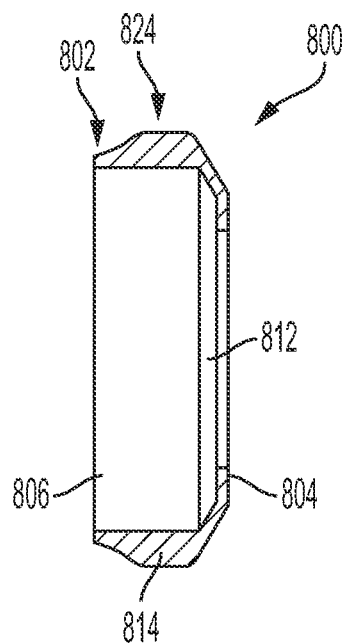
Figure 9C:
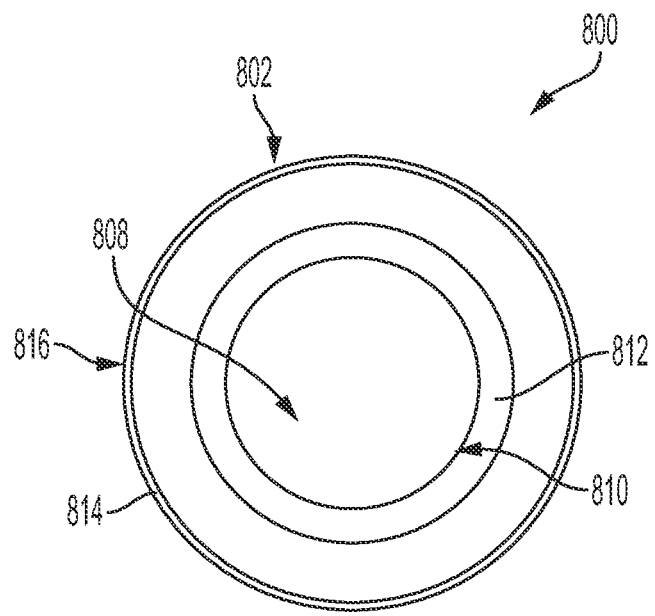

Referring now to FIG. 7, fastener 200 for connecting a first coated conduit 204 to a second coated conduit 202, in some non-limiting embodiments, may be the same or similar to fastener 100. Polymeric material 224 of fastener 200 may include central portion 226 and polymeric material 224 may coat at least a first end of a bushing. First flexible sleeve 228 may be formed from polymeric material 224 and first flexible sleeve 228 may extend from central portion 226 toward a second end of a bushing in a first direction. First flexible sleeve 228 and external threading of a bushing may create a cavity between an inner surface of first flexible sleeve 228 and external threading of a bushing. Second flexible sleeve 230 may be formed from polymeric material 224 and second flexible sleeve 230 may extend from central portion 226 in a second direction. The second direction may be opposite the first direction.

External threading of a bushing may be configured to be threaded into exposed threading of first coated conduit 204 such that first flexible sleeve 228 fits over circumference 206 of first coated conduit 204 to form a sealed connection. Internal threading of a bushing may be configured to be threaded onto exposed threading of second coated conduit 202 such that second flexible sleeve 230 fits over a circumference 212 of second coated conduit 202 to form a sealed connection.

In some non-limiting embodiments, fastener 200 may be configured to connect first coated conduit 204 to second coated conduit 202, and second coated conduit 202 may have circumference 212. Circumference 212 may be smaller than circumference 206 of first coated conduit 204. Fastener 200 may be manufactured in a variety of different sizes to accommodate a variety of different sizes of conduit.

In some non-limiting embodiments, a method for connecting a first coated conduit such as first coated conduit 204 to a second coated conduit such as second coated conduit 202 may include providing fastener 100, 200, as described above. The method may further include threading the external threading of a bushing (e.g. external threading 122 of bushing 114) into exposed threading of first coated conduit 204 such that first flexible sleeve 128, 228 fits over a circumference 206 of first coated conduit 204 to form a sealed connection, and threading the internal threading of a bushing (e.g. internal threading 120 of bushing 114) onto exposed threading of second coated conduit 202 such that second flexible sleeve 130, 230 fits over circumference 212 of first coated conduit 202 to form a sealed connection.

Referring now to FIGS. 8 and 9A-9C, FIGS. 8 and 9A-9C are a perspective view, a side view, a sectional view, and a top view, respectively, of adaptor fitting 800 that may be implemented in a conduit system to connect a first conduit to a second conduit. As shown in FIGS. 8 and 9A-9C, fitting 800 may include cylindrical body 802, and body 802 may be made of polymeric material 824. Body 802 may include first end 804, second end 806 and aperture 808. Aperture 808 may define inner surface 810. As further shown in FIGS. 8 and 9A-9C, body 802 may include gasket 812, and gasket 812 may be integrally formed from polymeric material 824 with body 802 at first end 804 of body 802. As further shown in FIGS. 8 and 9A-9C, body 802 may include lip 814. Lip 814 may be integrally formed from polymeric material 824 on outer surface 816 of body 802 and lip 814 may be between first end 804 and second end 806.

In some non-limiting embodiments, outer surface 816 of body 802 may be configured to extend into a first conduit such that lip 814 and the inner circumference of the first conduit form a sealed connection. Inner surface 810 of body 802 may be configured to accept an outer circumference of a second conduit such that inner surface 810 of body 802 and an outer circumference of the second conduit form a sealed connection when the second conduit abuts gasket 812.

In some non-limiting embodiments, as shown in FIGS. 8 and 9A-9C, polymeric material 824 of fitting 800 may be polyvinyl chloride (PVC). In other non-limiting embodiments, polymeric material 824 of fitting 800 may be comprised of another suitable plastic or polymer such as high density polyethylene (HDPE), polypropylene (PP), or the like.

In some non-limiting embodiments, body 802 of fitting 800 may be manufactured by injection molding.

In some non-limiting embodiments, fitting 800 may be configured to connect a first flexible conduit to a second rigid conduit.

Fitting 800 may be manufactured in a variety of different sizes to accommodate a variety of different sizes of conduits and fittings. For example, in some non-limiting embodiments for a three-quarter inch (¾") trade size, fitting 800 may have an outer diameter of between 1.75 inches and 2.25 inches, of between 1.903 inches and 1.913 inches, or of 1.908 inches. In some non-limiting embodiments for a three-quarter inch (¾") trade size, fitting 800 may have a thickness of between 0.5 inches and 0.6 inches, of between 0.575 inches and 0.585 inches, or of 0.580 inches.

While several examples of the reducing fastener device, assemblies, and methods for connecting a coated conduit to a fitting and for connecting a first coated conduit to a second coated conduit are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

What is claimed is:

1. A fastener for connecting a coated conduit to a fitting, comprising:
    a bushing having a first end, a second end, internal threading extending between the first end and the second end, and external threading extending between the first end and the second end; and
    polymeric material coating and surrounding an external surface of the bushing including the external threading of the bushing, the polymeric material comprising:
        a central portion coating at least the first end of the bushing;
        a first flexible sleeve formed from the polymeric material extending from the central portion toward the second end of the bushing in a first direction and creating a cavity between an inner surface thereof and the polymeric material coating the external threading of the bushing; and
        a second flexible sleeve formed from the polymeric material extending from the central portion in a second direction, opposite the first direction,
    wherein the first flexible sleeve extends beyond the bushing and the external threading of the bushing in the first direction, and
    wherein the external threading of the bushing and the polymeric material coating the external threading of the bushing are configured to be threaded into exposed threading of the fitting such that the first flexible sleeve fits over a circumference of the fitting to form a sealed connection and the internal threading of the bushing is configured to be threaded onto exposed threading of the coated conduit such that the second flexible sleeve fits over a circumference of the coated conduit to form a sealed connection.

2. The fastener of claim 1, wherein the circumference of the coated conduit is smaller than the circumference of the fitting.

3. The fastener of claim 1, wherein the polymeric material is polyvinyl chloride.

4. The fastener of claim 1, wherein the bushing is manufactured from steel or aluminum.

5. A fastener for connecting a first coated conduit to a second coated conduit, comprising:
   a bushing having a first end, a second end, internal threading extending between the first end and the second end, and external threading extending between the first end and the second end; and
   polymeric material coating and surrounding an external surface of the bushing including the external threading of the bushing, the polymeric material comprising:
      a central portion coating at least the first end of the bushing;
      a first flexible sleeve formed from the polymeric material extending from the central portion toward the second end of the bushing in a first direction and creating a cavity between an inner surface thereof and the polymeric material coating the external threading of the bushing; and
      a second flexible sleeve formed from the polymeric material extending from the central portion in a second direction, opposite the first direction,
   wherein the first flexible sleeve extends beyond the bushing and the external threading of the busing in the first direction, and
   wherein the external threading of the bushing and the polymeric material coating the external threading of the bushing are configured to be threaded into exposed threading of the first coated conduit such that the first flexible sleeve fits over a circumference of the first coated conduit to form a sealed connection and the internal threading of the bushing is configured to be threaded onto exposed threading of the second coated conduit such that the second flexible sleeve fits over a circumference of the second coated conduit to form a sealed connection.

6. The fastener of claim 5, wherein the circumference of the first coated conduit is greater than the circumference of the second coated conduit.

7. The fastener of claim 5, wherein the polymeric material is polyvinyl chloride.

8. The fastener of claim 5, wherein the bushing is manufactured from steel or aluminum.

9. A conduit system comprising:
   a coated conduit comprising a cylindrical body with a first end comprising exposed threading; and
   a fastener comprising:
      a bushing having a first end, a second end, internal threading extending between the first end and the second end, and external threading extending between the first end and the second end; and
      polymeric material coating and surrounding an external surface of the bushing, the polymeric material comprising:
         a central portion coating at least the first end of the bushing;
         a first flexible sleeve formed from the polymeric material extending from the central portion toward the second end of the bushing in a first direction and creating a cavity between an inner surface thereof and the external threading of the bushing; and
         a second flexible sleeve formed from the polymeric material extending from the central portion in a second direction, opposite the first direction,
      wherein the internal threading of the bushing is threaded onto the exposed threading of the coated conduit such that the second flexible sleeve fits over a circumference of the coated conduit to form a sealed connection.

10. The conduit system of claim 9, wherein the external threading of the bushing is threaded into exposed threading of a fitting such that the first flexible sleeve fits over a circumference of the fitting to form a sealed connection.

11. The conduit system of claim 9, wherein the polymeric material is polyvinyl chloride.

12. The conduit system of claim 9, wherein the bushing is manufactured from steel or aluminum.

13. A method of connecting a coated conduit to a fitting comprising:
   providing a fastener comprising:
      a bushing having a first end, a second end, internal threading extending between the first end and the second end, and external threading extending between the first end and the second end; and
      polymeric material coating and surrounding an external surface of the bushing, the polymeric material comprising:
         a central portion coating at least the first end of the bushing;
         a first flexible sleeve formed from the polymeric material extending from the central portion toward the second end of the bushing in a first direction and creating a cavity between an inner surface thereof and the external threading of the bushing; and
         a second flexible sleeve formed from the polymeric material extending from the central portion in a second direction, opposite the first direction,
   threading the external threading of the bushing into exposed threading of the fitting such that the first flexible sleeve fits over a circumference of the fitting to form a sealed connection; and
   threading the internal threading of the bushing onto exposed threading of the coated conduit such that the second flexible sleeve fits over a circumference of the coated conduit to form a sealed connection.

14. The method of claim 13, wherein the polymeric material is polyvinyl chloride.

15. The method of claim 13, wherein the bushing is manufactured from steel or aluminum.

* * * * *